(12) United States Patent
Sandberg et al.

(10) Patent No.: US 6,669,005 B2
(45) Date of Patent: Dec. 30, 2003

(54) SERVO-CONTROLLED DISTRIBUTION CONVEYOR

(75) Inventors: Glenn Sandberg, Lockport, IL (US); Scott A. Lindee, Mokena, IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 10/201,047

(22) Filed: Jul. 23, 2002

(65) Prior Publication Data

US 2003/0034225 A1 Feb. 20, 2003

Related U.S. Application Data

(60) Provisional application No. 60/309,272, filed on Aug. 1, 2001.

(51) Int. Cl.[7] .............................................. B65G 43/00
(52) U.S. Cl. .................................................... 198/460.2
(58) Field of Search ................... 198/460.2, 459.1, 198/460.1, 464.1, 502.2, 576, 588, 594

(56) References Cited

U.S. PATENT DOCUMENTS

| | | | |
|---|---|---|---|
| 3,751,873 A | * | 8/1973 | Toby ............................ 198/34 |
| 3,965,783 A | | 6/1976 | Muller et al. |
| 3,994,386 A | | 11/1976 | Toby |
| 4,067,435 A | | 1/1978 | Toby |
| 4,371,076 A | | 2/1983 | Nakao |
| 4,379,416 A | | 4/1983 | Kuchler |
| 4,431,104 A | | 2/1984 | Orlowski et al. |
| 4,684,008 A | | 8/1987 | Hayashi et al. |
| 4,793,228 A | | 12/1988 | Etter et al. |
| 4,846,336 A | | 7/1989 | Hoyland et al. |
| 4,926,999 A | | 5/1990 | Fauth, Sr. et al. |
| 5,174,430 A | | 12/1992 | Ebira |
| 5,209,339 A | | 5/1993 | Antonissen |
| 5,267,638 A | | 12/1993 | Doane |
| 5,322,154 A | * | 6/1994 | Lenherr ....................... 198/460 |
| 5,547,004 A | * | 8/1996 | Fransen .................... 198/460.2 |
| 5,906,265 A | * | 5/1999 | Spatafora .................. 198/460.2 |
| 6,035,994 A | * | 3/2000 | Blatter ....................... 198/343.1 |
| 6,341,685 B1 | * | 1/2002 | Spatafora et al. ......... 198/460.2 |
| 6,554,124 B2 | * | 4/2003 | Colamussi et al. ....... 198/418.6 |

FOREIGN PATENT DOCUMENTS

EP         0 634 325 B1    12/1997

* cited by examiner

*Primary Examiner*—Douglas A. Hess
(74) *Attorney, Agent, or Firm*—Polit & Erickson, LLC

(57) ABSTRACT

A feed conveyor is operable in a first direction to deposit a stream of articles across a width of a downstream conveyor operating along a second direction, the second direction being at an angle to the first direction. The feed conveyor is an extendable conveyor that is accurately controlled for circulating speed, extension speed and retraction speed, to deposit articles transversely onto the downstream conveyor in a tightly spaced, grid pattern. The extension and retraction speed are controlled by a first servomotor and the conveying speed of the feed conveyor is controlled by a second servomotor.

22 Claims, 4 Drawing Sheets

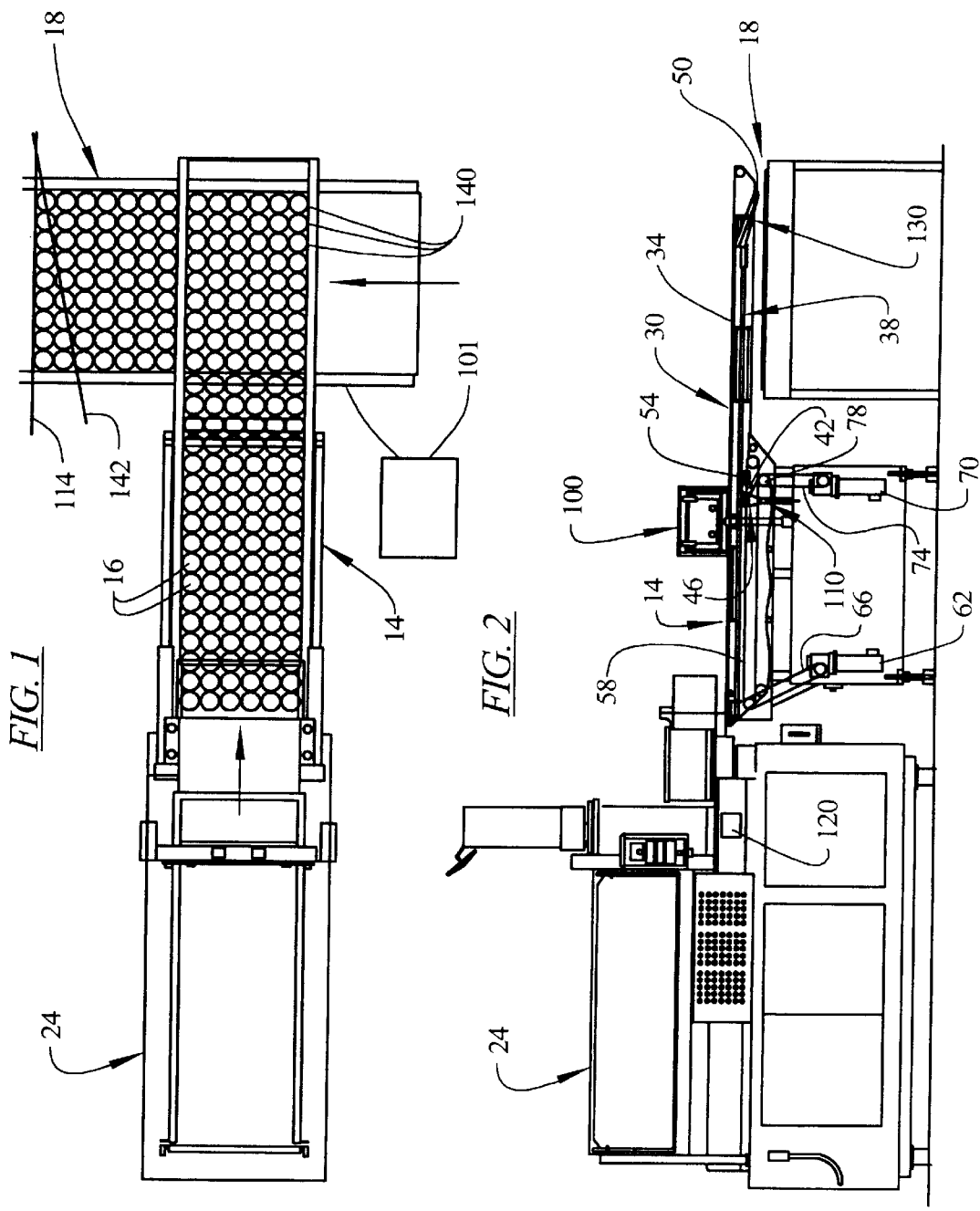

SERVO-CONTROLLED DISTRIBUTION CONVEYOR

This application claims the benefit of provisional application U.S. Serial No. 60/309,272 filed Aug. 1, 2001.

TECHNICAL FIELD OF THE INVENTION

The invention relates to conveyors for positioning articles, and more particularly relates to a conveyor system for positioning meat patties from a feed conveyor onto a downstream conveyor.

BACKGROUND OF THE INVENTION

Conveyor systems are known which include a feed conveyor arranged to receive a stream of meat patties from a meat patty-forming machine in a grid pattern having a first width, and which deposit the stream onto a downstream conveyor that is arranged below and at a right angle to the feed conveyor. The downstream conveyor has a wider width and a slower operating speed. The downstream conveyor is typically used for treating the patties, such as for conveying the patties through a thermal treating unit, either a heating or a cooling unit.

The feed conveyor is controllably extendable and retractable to distribute the stream in a longitudinal direction onto the downstream conveyor, in the lateral direction across a width of the downstream conveyor. The feed conveyor includes a wire mesh conveyor belt having a belt accumulation arrangement located beneath the top surface of the conveyor.

The amount of belt storage, and effectively, the length of the top conveying surface, of the feed conveyor are controlled by movement of a carriage. The carriage carries an idler roller or pulley that is wrapped by the belt. The carriage is moved by a pneumatically controlled cylinder. The conveyor system is operated using pneumatic controls. The carriage retract distance is set by a limit switch. The carriage retraction speed and advancement speed are controlled by pneumatic flow control. The retraction of the carriage is initiated by an electric photo-eye. The conveyor belt circulating speed is controlled by variable speed pulleys.

Although the aforementioned system operates effectively, the present inventors have recognized the desirability of providing a system that is more easily adjusted and controlled, and can be more cost effectively manufactured, and which can be more efficiently and effectively operated.

SUMMARY OF THE INVENTION

The invention provides a feed conveyor for depositing articles onto a downstream conveyor, comprising: an endless circulating belt having an upper conveying surface; a roller controlling a belt accumulation region of the endless circulating belt, the conveying surface having an upstream region adapted to receive a stream of articles in rows across a lateral direction of the belt, the belt circulated to move the rows in the longitudinal direction to an end of the conveying surface, wherein the endless belt is turned over at the end, wherein circulation of the belt passes the rows off of the conveying surface to be deposited onto the downstream conveyor, and the longitudinal position of the end is movable between an extended position and a retracted position passing across at least a portion of a transverse dimension of the downstream conveyor by longitudinal positioning of the roller; a first electric motor and a traction device, the traction device engaged to be translated by the first electric motor, the roller mechanically connected to the traction device to be moved longitudinally thereby; a second electric motor, wherein the conveying surface is circulated by mechanical communication from the second electric motor; and a controller operationally connected to the first and second electric motors to precisely control the conveying speed of the conveying surface and the position of the end.

The invention also provides a system for depositing patties onto a downstream conveyor, comprising: a patty-forming machine having a reciprocating mold plate and a mechanism to eject patties from the reciprocating mold plate; a feed conveyor having an endless circulating belt with an upper conveying surface and a roller controlling a belt accumulation region of the endless circulating belt, the conveying surface having an upstream region adapted to receive a stream of patties from the patty-forming machine in rows across a lateral direction of the belt, the belt circulated to move the rows in the longitudinal direction to an end of the conveying surface, wherein the endless belt is turned over at the end, wherein circulation of the belt passes the rows off of the conveying surface to be deposited onto the downstream conveyor, and the longitudinal position of the end is movable between an extended position and a retracted position passing across at least a portion of a transverse dimension of the downstream conveyor by longitudinal positioning of the roller; a first electric motor and a traction device, the traction device engaged to be translated by the first electric motor, the roller mechanically connected to the traction device to be moved longitudinally thereby; a second electric motor, wherein the conveying surface is circulated by mechanical communication from the second electric motor; and a controller operationally connected to the first and second electric motors to precisely control the conveying speed of the conveying surface and the position of the end.

According to an exemplary embodiment, the present invention provides a feed conveyor operable in a first direction to deposit a stream of articles across a width of a downstream conveyor operating along a second direction, the second direction being at an angle to the first direction. The feed conveyor is an extendable conveyor that is accurately controlled for circulating speed, extension speed and retraction speed, to deposit articles transversely onto the downstream conveyor in a tightly spaced, grid pattern. The conveying speed of the feed conveyor is controlled by a first servomotor, and the extension and retraction speed are controlled by a second servomotor.

The feed conveyor includes a wire mesh conveyor belt having a belt accumulation arrangement located beneath the top surface of the conveyor.

The amount of belt storage, and effectively, the length of the top conveying surface, of the feed conveyor are controlled by movement of a carriage. The carriage carries an idler roller or pulley that is wrapped by the belt.

The feed conveyor is driven to convey at a precise speed by the servomotor. The carriage is connected to an endless belt drive that is precisely driven by the servomotor in both the extension and retraction directions.

According to the invention, a controller acts as an operator interface and as an automatic control. The desired extension and retraction distance is set by a keypad entry. The articles size is also set by a keypad entry. The speed of the articles entering the feed conveyor is input automatically. The home position of the carriage, the fully extended position of the feed conveyor, is input by a proximity sensor. The controller calculates the optimal article spacing using the retraction distance and the article size multiplied by a maximum whole number of articles to be spaced transversely across the downstream conveyor. The controller operates the servo controls such that carriage advancement or retraction speed, carriage advancement and retraction acceleration and deceleration, and carriage stroke, are all closely controlled. The carriage belt speed is closely controlled to match the input speed of articles fed onto the feed conveyor. The carriage retraction initiation is also controlled by the controller.

The present invention is particularly advantageous as applied to meat patties formed by a meat patty-forming machine such as a FORMAX F-26 machine available from Formax, Inc. of Mokena, Ill. and/or as described in U.S. Pat. Nos. 4,182,003 and 4,821,376, and/or PCT WO99/62344.

The patties are formed by the patty-forming machine and deposited onto the feed conveyor. The feed conveyor includes a circulating wire mesh belt that delivers a grid pattern stream of formed patties to an end of the conveyor wherein the patties are deposited row by row onto the downstream conveyor as the conveying surface of the feed conveyor is retracted across a width of the downstream conveyor. Both the feed conveyor and the downstream conveyor are continuously circulating. The patties deposited on the downstream conveyor are actually deposited in a slight angular grid pattern due to the continuous movement of the downstream conveyor during deposition of the patties thereon.

The circulating speed of the feed conveyor is servo controlled to match the patty output of the forming machine. A proximity sensor acts to sense the reciprocation of the mold plate of the forming machine to adjust the speed of the feed conveyor to achieve a closely-spaced, non-overlapping, continuously grid pattern of patties on the feed conveyor. The advancing speed of the end of the feed conveyor is closely controlled to be about equal to the circulating speed of the conveyor, and the retracting speed is closely controlled to precisely deposit rows of patties in a closely spaced grid positioning on the downstream conveyor.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 1 is a plan view of a conveying system of the invention;

FIG. 2 is a schematic sectional view of the conveying system of FIG. 1;

DETAILED DESCRIPTION OF THE PREFERRED EMBODIMENTS

Figure 3:
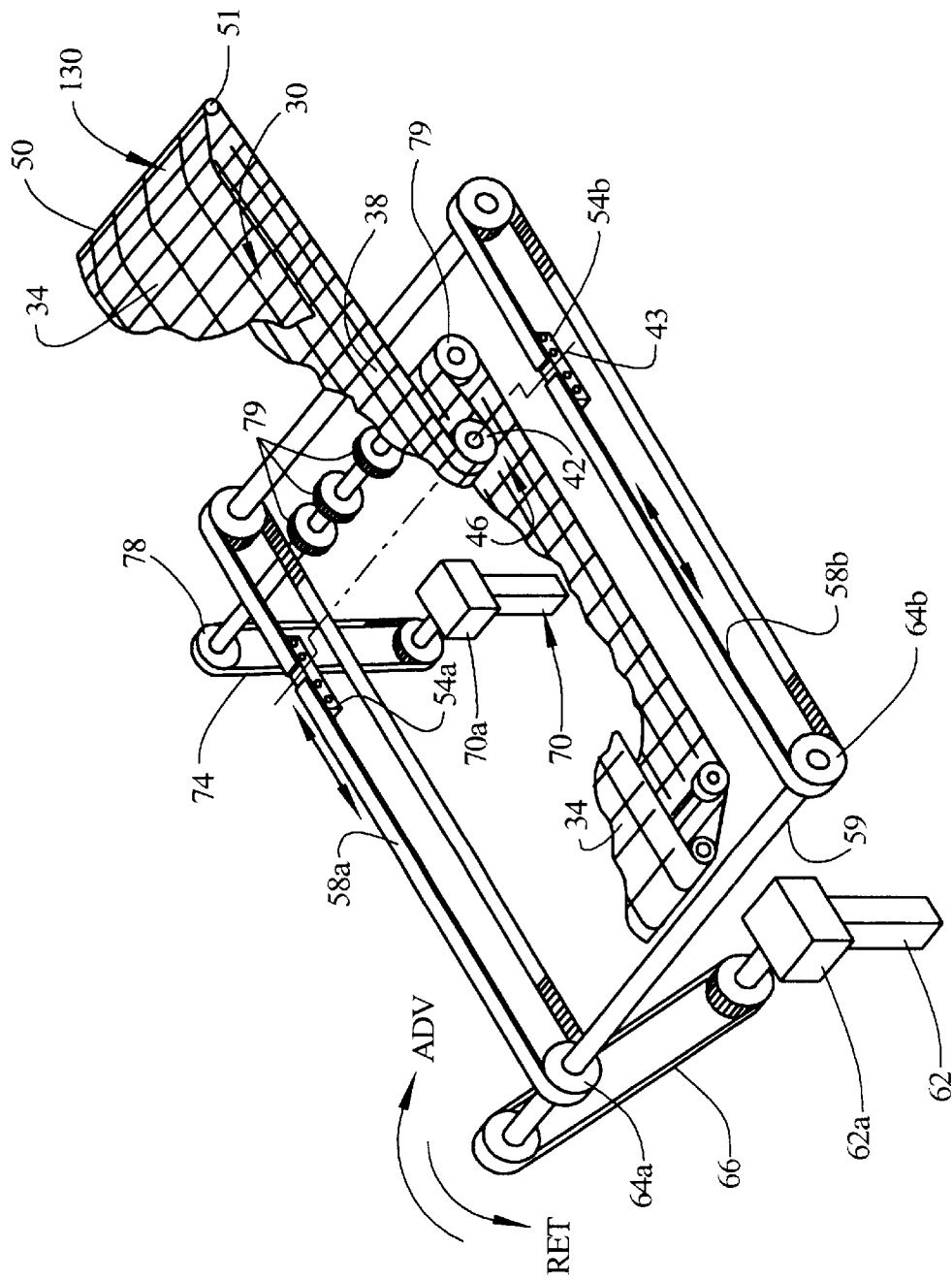
FIG. 3 is an enlarged perspective view of a portion of the conveying system of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiment illustrated.

FIGS. 1–3 illustrate a first embodiment conveying system 10 of the present invention. The system 10 includes a feed conveyor 14 that deposits articles, such as meat patties 16, onto a downstream conveyor 18. The feed conveyor 14 receives the patties 16 from a meat patty-forming machine 24. As an example, the machine 24 delivers a closely spaced, grid pattern stream of patties 16.

The feed conveyor 14 includes an endless belt, wire mesh belt 30. The wire mesh belt 30 forms a top conveying region or surface 34 and a bottom region 38. The bottom region 38 has a portion wrapped around a movable roller or idler pulley 42, effectively creating a belt accumulation region 46. Movement of the pulley 42 controls the extension or retraction of the top region 34, and the position of an end 50 of the top region 34. The top region 34 is turned over to the bottom region 38 at the end 50 by use of a roller or axle 51.

The pulley or roller 42 is rotationally connected by an axle 43 (shown schematically by a dashed line in FIG. 4) to carriages 54a,54b. A first electric motor 62 is operatively connected to a traction system for moving the carriages 54a, 54b. According to a preferred embodiment, the traction system comprises a pair of endless belts, positioning belts 58a, 58b. The carriages 54a, 54b are connected to the positioning belts 58a, 58b. The first motor 62 is operatively connected by a belt 66 to drive the positioning belts 58a, 58b. The belt 66 is wrapped around a drive pulley 63 which circulates the belts 58a, 58b via an axle 59 and sprockets or pulleys 64a, 64b. The first electric motor thus controls the retraction and extension of the end 50 via movement of the carriage 54 and the pulley 42.

A second electric motor 70 is operatively connected by an endless belt 74 to a drive pulley 78 of the belt 30. The second electric motor 70 drives sprockets 79 to drive the belt 30. The second electric motor 70 closely controls the speed of circulation of the wire mesh belt 30.

The electric motors 62, 70 preferably drive the respective belts 66, 74 via gear boxes 62a, 70a. The electric motors are preferably precise positioning motors, such as servomotors, that incorporate numerical encoders for precise control. For example, the motor 62 communicates exact positioning information or feedback to a controller 100 for precise control of the end 50 of the conveyor during both advancement and retraction. The motor 70 communicates exact positioning information or feedback to the controller to ensure precise coordination between the belt speed and the forming machine patty-output speed.

Figure 5:
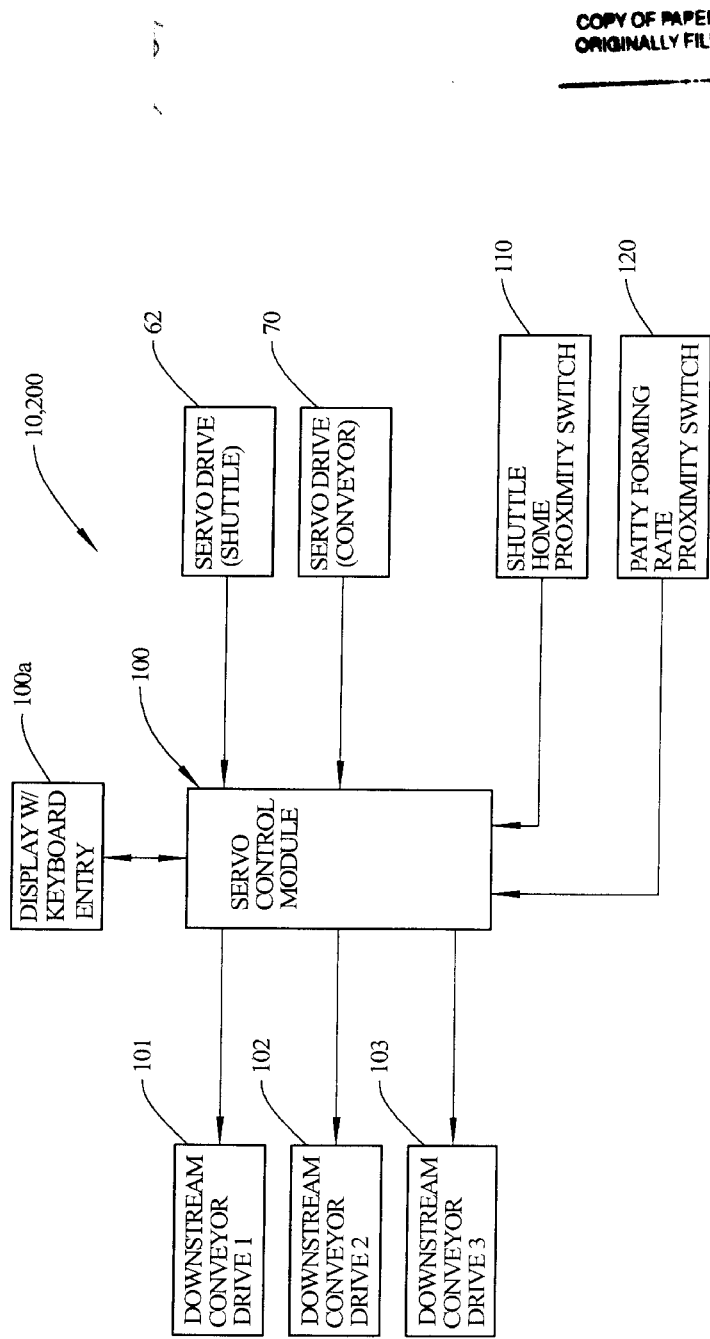
FIG. 5 is a schematic block diagram of a control system for the conveying systems of FIGS. 1 through 4.

The controller 100, such as a programmable logic controller (PLC), a microprocessor, a CPU or other control device, is signal connected to the motors 62, 70. The controller 100 can also receive operator input from a keypad 100a (FIG. 5). A proximity sensor 110 senses the position of the carriage, with the end 50 fully extended as the "home" position. The sensor 110 is also signal-connected to the controller 100. The controller 100 can ensure a proper initial position of the feed conveyor end 50 by automatically extending the end 50 using the motor 62, until the home position is sensed by the sensor 110.

A proximity sensor 120 is mounted to the patty-forming machine mold plate to sense reciprocation of the plate. The sensor 120 is signal-connected to the controller 100. The controller 100 adjust the speed of the motor 70 to ensure that the machine output of patties onto the conveyor 30 matches the speed of the conveyor to achieve a closely packed grid pattern of patties on the conveyor 30.

Adjacent to the end 50 of the conveyor 30, is a ramp region 130. The ramp region 130 is angled downwardly toward the second conveyor in order to gently deposit meat patties onto the conveyor. The angle of the ramp region 130 is manually adjustable in order to ensure that a gentle deposit occurs during retraction, and to ensure noninterference with patties on the downstream conveyor during advancement of the end 50.

The controller 100 closely controls the movement of the motor 62 so that the rows 140 of patties are deposited onto the downstream conveyor 18 as the end 50 is retracted, in a closely spaced grid pattern. The operator inputs the retraction distance of the end 50 and the patty size by keypad entry. The controller 100 calculates the optimal patty spacing using the retraction distance and the patty size multiplied by a maximum whole number of patties to be spaced transversely across the downstream conveyor 18. For simplicity, the grid pattern shown in FIG. 1 is shown as a straight grid pattern having a straight row alignment 141. In fact, due to the continuous movement of the conveyor 18 the alignment will be an angled alignment 142. Once fully retracted, the controller 100 closely controls the speed of the motor 62 so that the leading row of patties, the row close to the end 50, is not prematurely deposited until the end 50 reaches his fully extended position. Once the fully extended position is reached, retraction begins immediately thereafter to deposit the next group of patties. The retraction and extension (stroke) of the conveyor 14 is reciprocal to fill the downstream conveyor.

As illustrated in FIG. 5, the controller 100 also can receive a speed signal from the downstream conveyor 18 and can then adjust either the downstream conveyor speed via first and/or second drives 101, 102, or first, second and third drives 101, 102, 103, and/or adjust the forming machine patty output speed and the motors 62, 70 such that all speeds are coordinated to achieve an optimally filled conveyor 18. The embodiment shown in FIGS. 1 through 3 utilizes one drive 101 for the downstream conveyor.

Figure 4:
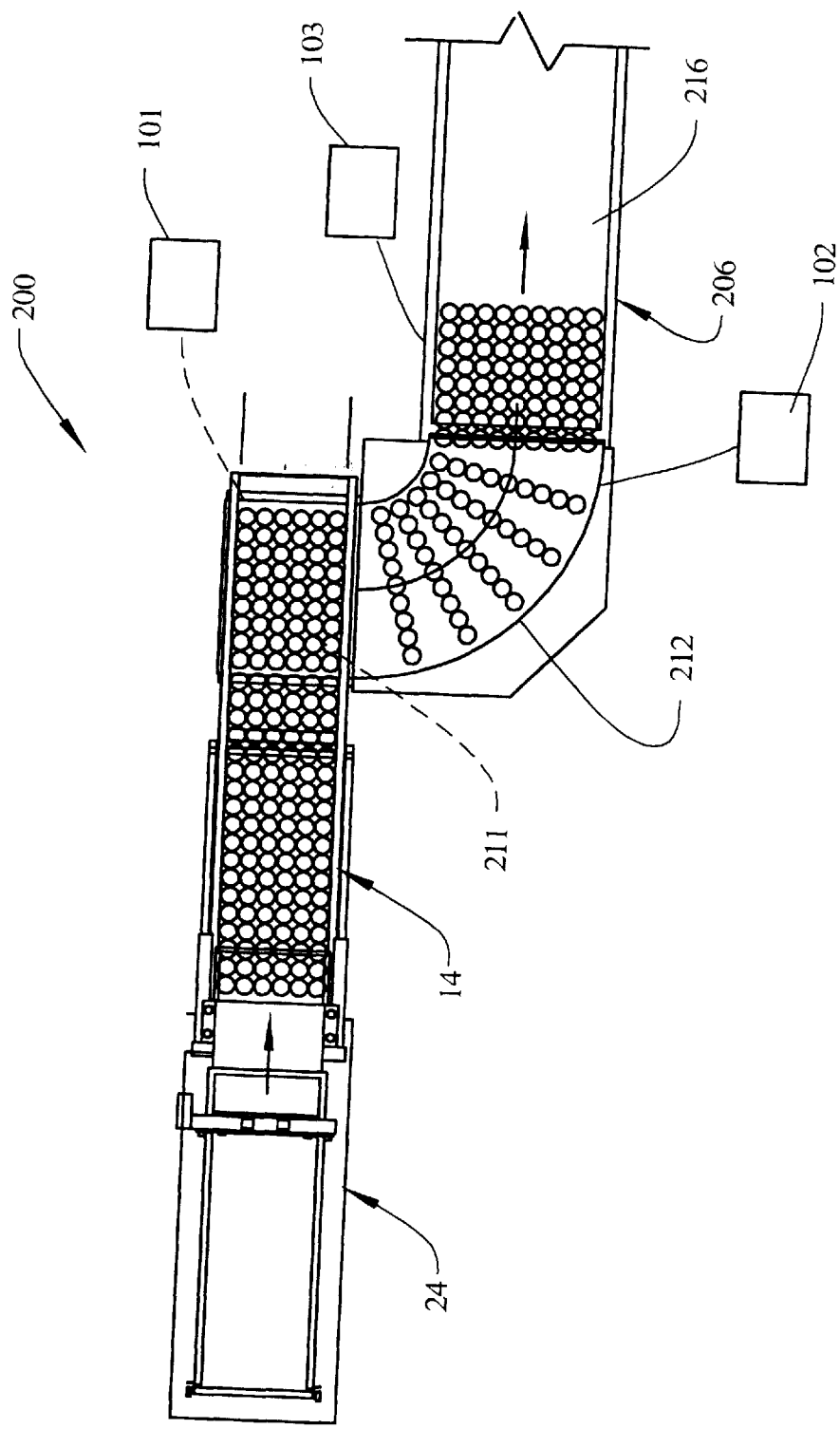
FIG. 4 is a plan view of an alternate conveying system according to the present invention.

FIG. 4 illustrates an alternate embodiment 200 wherein the downstream conveyor is replaced by a conveyor 206 having a first perpendicular conveyor section 211 beneath the feed conveyor 14, an arcuate conveyor section 212 connected to an in-line conveyor 216. The feed conveyor 14 is otherwise identical to that described for the first embodiment. The first conveyor section 211 is driven by the first drive 101 and the arcuate conveying section 212 is driven by the second drive 102. The arcuate section 212 requires a different drive to independently adjust the speed of the arcuate section 212. The in-line conveyor 216 can be driven by a third drive 103.

As illustrated in FIG. 5, the controller 100 can control the first and second drives 101, 102, or all three drives 101, 102, 103, and/or adjust the forming machine patty output speed and the motors 62, 70 such that all speeds are coordinated to achieve an optimally filled in-line conveyor 216. Optionally, the third drive 103 can be manually speed-controlled.

Shuttle Conveyor General Description of Operation

According to a preferred embodiment, the feed conveyor or "shuttle conveyor" is controlled with two servomotors 62, 70. The first servomotor 62 controls the shuttle movement onto the downstream conveyor 18. The shuttle conveyor 14 can be located in the home position automatically using the shuttle home proximity switch 110. The shuttle distance is entered via the keypad 100a. The shuttle advance speed, retract speed, acceleration, and deceleration are all automatically calculated. The second servomotor 70 controls the speed of the wire belt conveyor 30. This speed can be automatically calculated using two pieces of information. This first parameter is the patty size. This parameter is entered via the keypad 100a. The second parameter is the forming machine speed. This is calculated automatically with the patty forming rate proximity switch 120. This allows the shuttle conveyor to increase and decrease speed automatically to match the forming machine speed.

The preferred embodiments of the invention allow for a number of advantages in operation, such as:

1. The parameters entered via the keypad can be stored as product codes. This allows a one-time setup and fast changeovers.
2. Multiple product codes can be stored, such as 20 product codes.
3. The shuttle conveyor can be automatically set by a home sequence.
4. The downstream conveyor speeds can be automatically adjusted.
5. The true positioning control of the shuttle conveyor allows for automatic shuttle conveyor retract initiation.
6. The controller includes the ability to stop the retraction of the shuttle conveyor, for any empty rows produced by the forming machine, thus maximizing downstream belt coverage.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A feed conveyor for depositing articles onto a downstream conveyor, comprising:

an endless circulating belt having an upper conveying surface;

a roller controlling a belt accumulation region of said endless circulating belt, said conveying surface having an upstream region adapted to receive a stream of articles in rows across a lateral direction of said belt, said belt circulated to move said rows in said longitudinal direction to an end of said conveying surface, wherein said endless belt is turned over at said end, wherein circulation of said belt passes said rows off of said conveying surface to be deposited onto said downstream conveyor, and said longitudinal position of said end is movable between an extended position and a retracted position passing across at least a portion of a transverse dimension of said downstream conveyor by longitudinal positioning of said roller;

a first electric motor and a traction system, said traction system engaged to be translated by said second electric motor, said roller mechanically connected to said traction system to be moved longitudinally thereby;

a second electric motor, wherein said conveying surface is circulated by mechanical communication from said second electric motor; and a controller operatively connected to said first and second electric motors to precisely control the position of said end and the conveying speed of said conveying surface.

2. The feed conveyor according to claim 1, wherein said first and second electric motors comprise precise positioning motors that provide precise positioning feedback to said controller.

3. The feed conveyor according to claim 2, comprising a proximity sensor that is signal-connected to said controller, said proximity sensor communicating an exact position of said traction system when said end is at a home position.

4. The feed conveyor according to claim 3, wherein said home position is a position wherein said conveying surface is fully extended.

5. The feed conveyor according to claim 1, wherein the speed of the downstream conveyor is controlled by said controller.

6. The feed conveyor according to claim 1, wherein said feed conveyor is associated with an apparatus that supplies articles at a supply rate, and said system includes a supply rate sensor for detecting said supply rate, said sensor being signal-connected to said controller.

7. The feed conveyor according to claim 6, wherein said apparatus comprises a molding machine having a reciprocating mold plate, wherein articles are reciprocally ejected from said mold plate and delivered onto said conveyor, and said sensor comprises a proximity sensor that is adapted to sense reciprocation of said mold plate.

8. The feed conveyor according to claim 6, comprising a keypad that is signal-connected to said controller, and said controller is adapted to accept through said keypad an article size and a supply rate of articles being supplied to said feed conveyor and said controller automatically adjusts and controls speed of said first and second electric motors to arrange said articles on said downstream conveyor in a pre-selected pattern.

9. The feed conveyor according to claim 1, wherein a region of said conveying surface adjacent said end is ramped down to be in close proximity to said downstream conveyor.

10. The feed conveyor according to claim 1, wherein said traction system comprises an endless belt conveyor.

11. The feed conveyor according to claim 1, wherein said first and second electric motors comprise servomotors.

12. A system for depositing patties onto a downstream conveyor, comprising:

a patty-forming machine having a reciprocating mold plate and a mechanism to eject patties from the reciprocating mold plate;

a feed conveyor having an endless circulating belt with an upper conveying surface and a roller controlling a belt accumulation region of said endless circulating belt, said conveying surface having an upstream region adapted to receive a stream of patties from said patty-forming machine in rows across a lateral direction of said belt, said belt circulated to move said rows in said longitudinal direction to an end of said conveying surface, wherein said endless belt is turned over at said end, wherein circulation of said belt passes said rows off of said conveying surface to be deposited onto said downstream conveyor, and said longitudinal position of said end is movable between an extended position and a retracted position passing across at least a portion of a transverse dimension of said downstream conveyor by longitudinal positioning of said roller;

a first electric motor and a traction system, said traction system engaged to be translated by said first electric motor, said roller mechanically connected to said traction system to be moved longitudinally thereby;

a second electric motor, wherein said conveying surface is circulated by mechanical communication from said second electric motor; and a controller operatively connected to said first and second electric motors to precisely control the position of said end and the conveying speed of said conveying surface.

13. The system according to claim 12, wherein said first and second electric motors comprise precise positioning motors that provide precise positioning feedback to said controller.

14. The system according to claim 13, comprising a proximity sensor that is signal-connected to said controller, said proximity sensor communicating an exact position of said traction system when said end is at a home position.

15. The system according to claim 14, wherein said home position is a position wherein said conveying surface is fully extended.

16. The system according to claim 12, wherein the speed of the downstream conveyor is controlled by said controller.

17. The system according to claim 12, wherein said system includes a patty rate sensor for detecting a supply rate of said patties, said sensor being signal-connected to said controller.

18. The system according to claim 17, wherein said sensor comprises a proximity sensor that is adapted to sense reciprocation of said mold plate.

19. The system according to claim 17, comprising a keypad that is signal-connected to said controller, and said controller is adapted to accept through said keypad a patty size and a patty supply rate, and said controller automatically adjusts and controls speed of said first and second electric motors to arrange patties on said downstream conveyor in a pre-selected pattern.

20. The system according to claim 12, wherein a region of said conveying surface adjacent said end is ramped down to be in close proximity to said downstream conveyor.

21. The system according to claim 12, wherein said traction system comprises an endless belt conveyor.

22. The system according to claim 12, wherein said first and second electric motors comprise servomotors.

* * * * *